(12) United States Patent
Igarashi et al.

(10) Patent No.: US 12,516,278 B2
(45) Date of Patent: Jan. 6, 2026

(54) FLOW PATH CASSETTE, CELL CULTURING KIT, AND CELL CULTURING SYSTEM

(71) Applicant: TERUMO KABUSHIKI KAISHA, Tokyo (JP)

(72) Inventors: Masatsugu Igarashi, Shizuoka (JP); Hirotaka Ohashi, Tokyo (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 847 days.

(21) Appl. No.: 17/864,209

(22) Filed: Jul. 13, 2022

(65) Prior Publication Data

US 2022/0348857 A1 Nov. 3, 2022

Related U.S. Application Data

(63) Continuation of application No. PCT/JP2021/004385, filed on Feb. 5, 2021.

(30) Foreign Application Priority Data

Feb. 6, 2020 (JP) .................................. 2020-018940

(51) Int. Cl.
 *C12M 1/00* (2006.01)
 *B01L 3/00* (2006.01)
 (Continued)

(52) U.S. Cl.
 CPC ............ *C12M 23/42* (2013.01); *C12M 23/14* (2013.01); *C12M 23/40* (2013.01); *C12M 25/10* (2013.01); *C12M 29/12* (2013.01)

(58) Field of Classification Search
 CPC .............................. C12M 23/42; C12M 23/48
 See application file for complete search history.

(56) References Cited

U.S. PATENT DOCUMENTS 5,416,022 A * 5/1995 Amiot .................... C12M 23/44
 435/297.2
5,462,416 A 10/1995 Dennehey et al.
 (Continued)

FOREIGN PATENT DOCUMENTS

EP 0531631 A1 3/1993
JP 2017-517390 6/2017
 (Continued)

OTHER PUBLICATIONS

English Translation of Official Action for Japan Patent Application No. 2022-529619, dated Oct. 28, 2024, 7 pages.
 (Continued)

*Primary Examiner* — Nathan A Bowers
(74) *Attorney, Agent, or Firm* — Sheridan Ross P.C.

(57) ABSTRACT

A flow path cassette, a cell culturing kit, and a cell culturing system are provided, which are capable of increasing a degree of freedom in the layout of the flow paths. A flow path cassette, in which flow paths are aggregated, is equipped with a first cassette main body in which flow paths are formed between resin sheets and a second cassette main body in which flow paths are formed between resin sheets, and a frame in which these elements are accommodated. In the frame, the first cassette main body is accommodated in a first accommodation space formed in a first direction, and the second cassette main body is accommodated in a second accommodation space formed in a second direction on an opposite side from the first direction.

20 Claims, 11 Drawing Sheets

(51) Int. Cl.
  *C12M 1/12* (2006.01)
  *C12M 3/00* (2006.01)

(56) References Cited

U.S. PATENT DOCUMENTS

| | | | |
|---|---|---|---|
| 7,347,849 B2* | 3/2008 | Brugger | A61M 1/15625 |
| | | | 210/651 |
| 7,479,123 B2* | 1/2009 | Briggs | A61M 1/36225 |
| | | | 604/4.01 |
| 2017/0088805 A1* | 3/2017 | Staheli | C12M 23/14 |
| 2018/0142199 A1* | 5/2018 | Jones | C12M 21/08 |
| 2018/0221878 A1 | 8/2018 | Tagawa et al. | |

FOREIGN PATENT DOCUMENTS

| | | |
|---|---|---|
| JP | 2017-143775 A | 8/2017 |
| WO | WO 2015/172255 | 11/2015 |
| WO | WO 2017/061619 | 8/2018 |
| WO | WO 2019/035415 A2 | 2/2019 |

OTHER PUBLICATIONS

Official Action with Machine Translation for China Patent Application No. 202180012087.2, dated Dec. 31, 2024, 12 pages.
International Search Report for International Application No. PCT/JP2021/004385, mailed May 18, 2021.
Written Opinion for International Application No. PCT/JP2021/004385, mailed May 18, 2021.
International Preliminary Report on Patentability for International Application No. PCT/JP2021/004385, mailed Aug. 18, 2022.

* cited by examiner

FLOW PATH CASSETTE, CELL CULTURING KIT, AND CELL CULTURING SYSTEM

CROSS REFERENCE TO RELATED APPLICATIONS

The present disclosure is a continuation of and claims benefit to PCT Application No. PCT/JP2021/004385 filed on Feb. 5, 2021, entitled "FLOW PATH CASSETTE, CELL CULTURING KIT, AND CELL CULTURING SYSTEM" which claims priority to Japanese Patent Application. No. 2020-018940 filed on Feb. 6, 2020. The entire disclosure of the applications listed above are hereby incorporated herein by reference, in their entirety, for all that they teach and for all purposes.

BACKGROUND

The present disclosure relates to a flow path cassette, a cell culturing kit, and a cell culturing system for treating cells.

In the practice of regenerative medicine, a treatment is performed in which a large amount of therapeutic cells such as ES cells, iPS cells, mesenchymal stem cells or the like are cultured and administered to a patient. As a cell culturing system for efficiently culturing therapeutic cells, for example, as disclosed in Japanese Patent Publication No. 2017-143775, a cell culturing system has been proposed for carrying out culturing of cells in a bioreactor in which hollow fibers are used.

In such a conventional cell culturing system, culturing of cells is carried out while supplying various nutrients such as oxygen and glucose together with a growth factor, while a liquid medium is circulated inside a disposable cell culturing kit constituting a closed system circuit. Therefore, in the cell culturing system, for example, there are connected a plurality of bags such as a cell bag in which cells to be seeded are accommodated, a culture medium bag in which a culture medium is accommodated, a waste liquid bag in which a waste liquid is collected, and a release solution bag for releasing cells from a flow path during cell harvesting, and the like.

SUMMARY

In such a conventional cell culturing system, a complex circuit is formed in which a plurality of bags are connected by a plurality of flow paths. For this reason, time is consumed by an operator performing operations to assemble the cell culturing kit on the cell culturing device, and mistakes are likely to be made when assembling the various flow paths.

Thus, it may be considered to use a flow path cassette in which flow paths are formed between a pair of resin sheets formed by superimposing and fusion bonding the sheets in a thickness direction. Such a flow path cassette is one in which complex circuits of the cell culturing kit are aggregated, and merely by connecting pipes that extend from various bags and a hollow fiber module to connectors provided on an outer edge of the flow path cassette, it is possible to assemble the cell culturing kit.

However, in the flow path cassette, since it is impossible to form flow paths that straddle between respective layers, the layout of the flow paths is limited. Therefore, a case may occur in which it is necessary to provide flow paths so as to largely bypass the other flow paths, and the size thereof may consequently be increased in scale. Further, a problem arises in that the arrangement of the connectors is restricted, and routing of the surrounding piping (e.g., tubes) tends to become complicated. Further, the same problems also arise in various types of cell-containing liquid treatment systems such as a cell cleaning system in which cleaning of cultured cells is performed.

Thus, the present disclosure has the object of providing a flow path cassette, a cell culturing kit, and a cell culturing system, which are capable of increasing a degree of freedom in the layout of the flow paths.

One aspect of the present disclosure is characterized by a flow path cassette in which flow paths are aggregated, including a first cassette main body in which flow paths (e.g., a first group of flow paths) are formed between a pair (e.g., a first pair) of superimposed resin sheets, a second cassette main body in which flow paths (e.g., a second group of flow paths) are formed between a pair (e.g., a second pair) of superimposed resin sheets, and a frame formed to be harder than the first cassette main body and the second cassette main body, and configured to support the first cassette main body and the second cassette main body, the frame including a flat plate-shaped cover member disposed between the first cassette main body and the second cassette main body, first side portions configured to project from outer edges of the cover member in a first direction perpendicular to the cover member, and second side portions configured to project from the outer edges of the cover member in a second direction opposite to the first direction, wherein the first cassette main body is accommodated in a first accommodation space defined in a recessed shape formed by the first side portions and the cover member, and the second cassette main body is accommodated in a second accommodation space defined in a recessed shape formed by the second side portions and the cover member.

Another aspect of the present disclosure is a flow path cassette in which flow paths are aggregated, including a first cassette main body in which flow paths are formed between a pair of superimposed resin sheets, and a second cassette main body in which flow paths are formed between a pair of superimposed resin sheets, and further including a first accommodation space formed in a bottomed shape having an opening in which one side thereof is opened, the first accommodation space being configured to accommodate therein the first cassette main body, and a second accommodation space formed in a bottomed shape having an opening in which one side thereof is opened, the second accommodation space being configured to accommodate therein the second cassette main body, wherein the first accommodation space and the second accommodation space are formed integrally so as to face toward each other with respective bottomed portions thereof in contact with each other.

Another aspect of the present disclosure is characterized by a cell culturing kit equipped with the flow path cassette of the above-described aspect, a plurality of bags connected to such a flow path cassette, a bioreactor in which hollow fibers connected to the flow path cassette are used, and a gas exchanger connected to the flow path cassette.

Yet another aspect of the present disclosure is characterized by a cell culturing system equipped with the cell culturing kit according to the above-described aspect, and a cell culturing device in which the cell culturing kit is set.

According to the flow path cassette, the cell culturing kit, and the cell culturing system of the above-described aspects, by being equipped with the first cassette main body and the second cassette main body which are arranged alongside one another in the thickness direction, it is possible for the flow paths to be arranged so as to straddle between respective layers, and the degree of freedom in the layout of the flow paths is increased.

DETAILED DESCRIPTION

Embodiments of the present disclosure will be presented and described in detail below with reference to the accompanying drawings.

Figure 1:
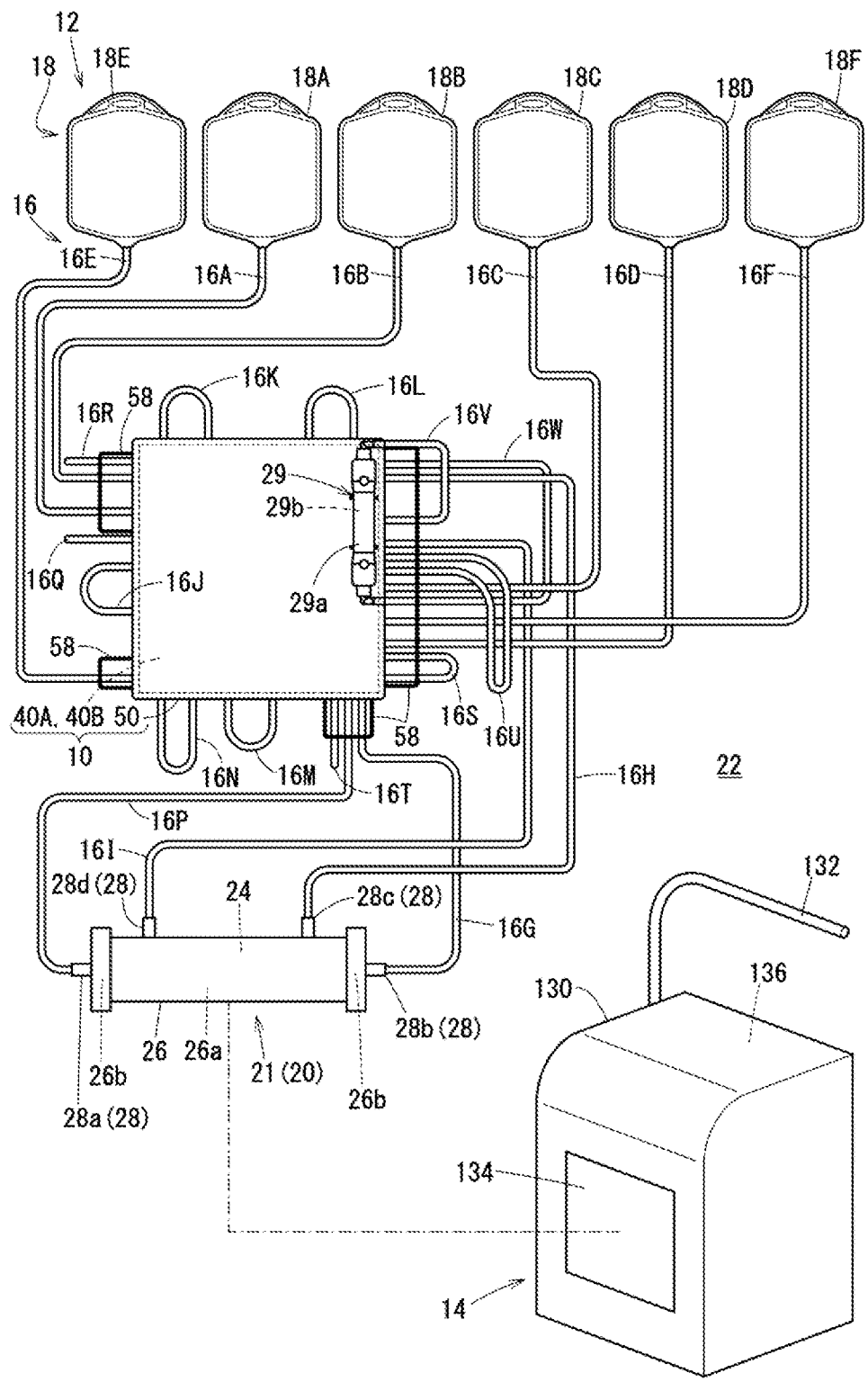
FIG. 1 is a schematic configuration diagram of a cell culturing system according to at least one embodiment of the present disclosure.

A flow path cassette 10 according to embodiments of the present disclosure, as shown in FIG. 1, may form one part of a cell culturing kit 12, and is set in a cell culturing device 14. The flow path cassette 10 collects together or aggregates a plurality of pathways of the cell culturing kit 12, and is used as a structural body which is capable of circulating a liquid containing cells to be cultured and a liquid for treating the cells.

In addition to the flow path cassette 10, the cell culturing kit 12 includes, as members that make up the plurality of pathways, a plurality of tubes 16, a plurality of bags 18, and a treatment chamber 20 that is set in the cell culturing device 14. The cell culturing kit 12 allows a plurality of types of liquids contained in each of the bags 18 to flow through the flow path cassette 10 and through each of the tubes 16 under the operation of the cell culturing device 14, and is obtains a target product by allowing the liquids to pass through the treatment chamber 20.

The cell culturing kit 12 according to the present embodiment is a disposable kit used for culturing therapeutic cells used in regenerative medicine, and a bioreactor 21 in which the cells are seeded and expanded is applied to the treatment chamber 20. Further, the liquids that flow inside the cell culturing kit 12 may be or comprise a solution containing cells (hereinafter referred to as a cell solution), a culture medium (culturing solution) which is supplied in order to expand the cells, a cleaning solution for cleaning the interior of the cell culturing kit 12, and a release solution for releasing the cells. More specifically, the cell culturing kit 12 and the cell culturing device 14 are part of a cell culturing system 22 that seeds the bioreactor 21 with the cell solution, together with supplying the culture medium and thereby culturing the cells, and thereafter, releases and collects the expanded cells from the bioreactor 21.

The biological cells are not particularly limited, and may include, for example, cells (e.g., T cells and/or the like) contained in blood, and stem cells (e.g., ES cells, iPS cells, mesenchymal stem cells, and/or the like). An appropriate culture medium may be selected according to the biological cells, and for example, such a culture medium may be or comprise a balanced salt solution (BSS) as a basic solution, and various amino acids, vitamins, serum and the like may be added thereto in order to prepare the culture medium. Further, the cleaning solution is not particularly limited, and examples thereof may include buffering solutions such as Phosphate Buffered Salts (PBS), Tris-Buffered Saline (TBS) and/or the like, or physiological saline. Further, as the release solution, for example, trypsin or an EDTA solution can be applied.

The plurality of bags 18 of the cell culturing kit 12 may include filled bags that are used in a state of being filled with liquids in advance, and empty bags for which usage thereof is started in an empty state. The filled bags include a cell solution bag 18A containing a cell solution, a cleaning solution bag 18B containing a cleaning solution, a culture medium bag 18C containing a culture medium, and a release solution bag 18F containing a release solution. Further, the empty bags include a waste liquid bag 18D into which a liquid to be discarded in the culturing process flows, and a collection bag 18E for collecting cells (and other liquids) obtained in the culturing step.

In the cell culturing device 14 of the cell culturing system 22, a plurality of cell culturing kits 12 can be set, and simultaneously, culturing can be performed using the plurality of cell culturing kits 12. Accordingly, certain ones of the plurality of bags 18 may be increased in size and provided so as to be shared and used by the plurality of cell culturing kits 12. The types of bags 18 that can be used in common with (e.g., shared by) the plurality of cell culturing kits 12 may include four types of bags, such as the culture medium bag 18C, the cleaning solution bag 18B, the release solution bag 18F, and the waste liquid bag 18D. The culture medium bag 18C, the cleaning solution bag 18B, the release solution bag 18F, and the waste liquid bag 18D may be configured in the form of rigid tanks, instead of the bags 18 which are formed by resin sheets 42 that possess flexibility.

The bags 18 are aseptically joined to respective ends of the tubes 16 using a non-illustrated aseptic joining device. Further, the bags 18 may be fixed to the respective ends of the tubes 16 in a non-separable manner, and may have a structure for ensuring sterility inside the cell culturing kit 12.

Alternatively, the cell culturing kit 12 may apply a connection structure (not shown) that enables a detachable connection between the tubes 16 and the bags 18.

Although not particularly limited, for the bioreactor 21 of the cell culturing kit 12, it is preferable to use a culturing base material having a large surface area, and for example, a structure having hollow fibers 24 may be applied thereto. More specifically, the bioreactor 21 includes a plurality of hollow fibers 24 (e.g., ten thousand or more), and a cylindrical container 26 having a main space 26a therein in which the plurality of hollow fibers 24 are accommodated.

The plurality of hollow fibers 24 include internal cavities (not shown) that penetrate along the direction of extension thereof, and the cells are cultured by becoming adhered on inner peripheral surfaces of the hollow fibers 24 that include the internal cavities. The hollow fibers 24 are accommodated along an axial direction of the container 26, and both ends thereof are retained by non-illustrated retaining walls. The diameters of the hollow cavities, for example, are formed on the order of approximately 200 micrometers, and communicate with end spaces 26b on both axial sides of the retaining walls.

Further, each of the hollow fibers 24 includes a plurality of non-illustrated pores therein that enable communication between the outer side (e.g., the main space 26a) and the internal cavities of the hollow fibers 24. The pores are formed with sizes that do not allow cells and proteins to pass, but on the other hand enable solutions and substances of low molecular weight to pass therethrough. The diameter of the pores is set, for example, on the order of 0.005 to 10 micrometers. Consequently, the culture medium, and a predetermined gas component and the like are supplied via the pores to the cells that are adhered to the inner peripheral surfaces of the hollow fibers 24. Hereinafter, a configuration in which liquid is primarily circulated in the internal cavities of the hollow fibers 24 may also be referred to as an intracapillary (IC) configuration, and a configuration in which liquid is primarily circulated on outer sides of the hollow fibers 24 may also be referred to as an extracapillary (EC) configuration.

The material of the hollow fibers 24 is not particularly limited, and examples thereof, may include polyolefin resins such as polypropylene, polyethylene and the like, and polymer materials such as polysulfone, polyether sulfone, polyacrylonitrile, polytetrafluoroethylene, polystyrene, polymethylmethacrylate, cellulose acetate, cellulose triacetate, regenerated cellulose, and the like.

The container 26 has an axial length which is capable of accommodating the hollow fibers 24 when the hollow fibers 24 are extended in a substantially linear shape. The container 26 is equipped with four terminals 28 (a first IC terminal 28a, a second IC terminal 28b, a first EC terminal 28c, and a second EC terminal 28d) that are connected respectively to the tubes 16. The first IC terminal 28a is provided at one end of the container 26 and communicates with the end space 26b on one end side. The second IC terminal 28b is provided at another end of the container 26 and communicates with the end space 26b on the other end side. The first EC terminal 28c is provided on an outer peripheral surface of the container 26 in the vicinity of the other end side, and communicates with the main space 26a at a location in close proximity to the other end. The second EC terminal 28d is provided on an outer peripheral surface of the container 26 in the vicinity of the one end side, and communicates with the main space 26a at a location in close proximity to the one end.

The plurality of tubes 16 are included in the cell culturing kit 12. Among these tubes, the tubes 16 that connect the flow path cassette 10, the bags 18, and the bioreactor 21 include the following: a cell solution tube 16A connected between the cell solution bag 18A and the flow path cassette 10, a cleaning solution tube 16B connected between the cleaning solution bag 18B and the flow path cassette 10, a culture medium tube 16C connected between the culture medium bag 18C and the flow path cassette 10, a waste liquid tube 16D connected between the waste liquid bag 18D and the flow path cassette 10, a collection tube 16E connected between the collection bag 18E and the flow path cassette 10, a first IC tube 16F connected between the first IC terminal 28a of the bioreactor 21 and the flow path cassette 10, a second IC tube 16G connected between the second IC terminal 28b of the bioreactor 21 and the flow path cassette 10, a first EC tube 16H connected between the first EC terminal 28c of the bioreactor 21 and the flow path cassette 10, and a second EC tube 16I connected between the second EC terminal 28d of the bioreactor 21 and the flow path cassette 10.

Further, among the plurality of tubes 16, there are included closed tubes 16 that protrude from the flow path cassette 10, together with being folded back and connected again to the flow path cassette 10. As the closed tubes 16, there are included the following: a first pump tube 16J, a second pump tube 16K, a third pump tube 16L, and a fourth pump tube 16M which are set on the plurality of (four) pumps 30 (see FIG. 5) of the cell culturing device 14; an air bubble sensor tube 16N that is set in an air bubble sensor 32 (see FIG. 5) of the cell culturing device 14; a sampling tube 16T for performing sampling of the liquid inside the flow paths; a sensor tube 16U for performing detection of components by the various sensors; a pair of gas exchange tubes 16V and 16W for connecting the flow path cassette 10 and the ports 29c and 29d of a gas exchanger 29; and interlayer connection tubes 16Q, 16R, and 16S for connecting the flow paths 44A of a first cassette main body 40A and the flow paths 44B of a second cassette main body 40B.

The gas exchanger 29 which mixes a predetermined gas component with a liquid (e.g., the culture medium) is disposed on the flow path cassette 10. Examples of the gas component to be mixed may include, but are in no way limited to, a component that approximates the mixing ratio (concerning the concentration of carbon dioxide, the concentration thereof inside a living body) of atmospheric air (nitrogen $N_2$: 75%, oxygen $O_2$: 20%, and carbon dioxide $CO_2$: 5%).

The structure of the gas exchanger 29 is not particularly limited, and in the same manner as the bioreactor 21, a structure can be applied in which a plurality of hollow fibers 29b are provided inside a container 29a. More specifically, the gas exchanger 29 guides the liquid flowing through an EC loop, which is a pathway that circulates on the EC side of the bioreactor 21, into the internal cavities of the hollow fibers 29b, and during movement thereof inside the hollow fibers 29b, the gas component that is supplied to the interior of the container 29a (the space on the outer side of the hollow fibers 29b) is mixed with the liquid through the pores of the hollow fibers 29b. At the same time, the gas exchanger 29 removes excess gas components from inside the liquid.

By joining the aforementioned tubes 16 in advance, the flow path cassette 10, which is one component of the cell culturing kit 12, functions as a relay unit through which the cell solution, the cleaning solution, the culture medium, and the release solution of the respective bags 18 are allowed to flow to a different bag 18 or to the bioreactor 21. When the cell culturing kit 12 is set in the cell culturing device 14, the flow path cassette 10 is mounted in a non-illustrated cassette placement location inside the cell culturing device 14, which simplifies the wiring operation of the tubes 16 in the culturing process.

Figure 2:
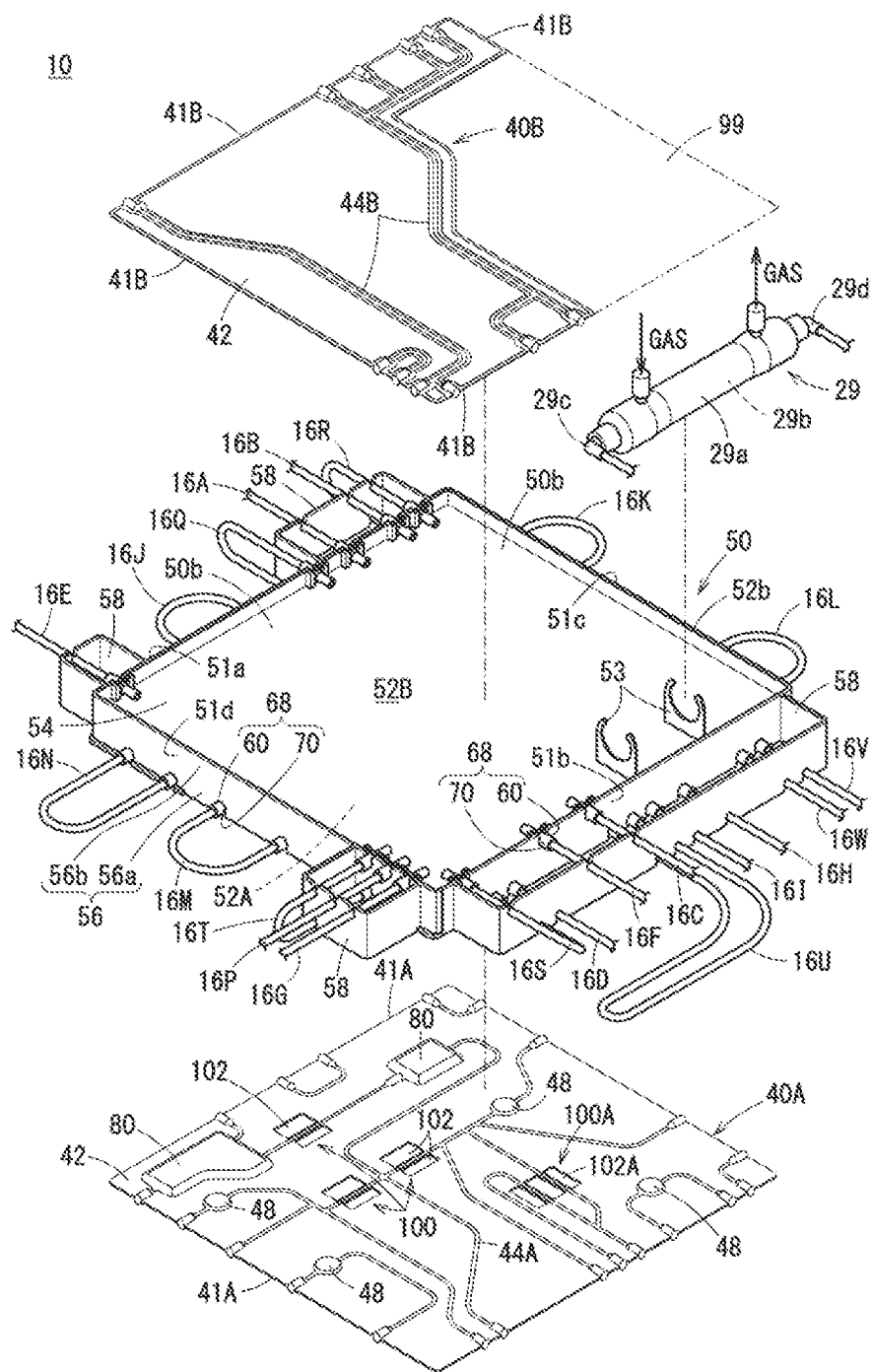
FIG. 2 is an exploded perspective view of the flow path cassette shown in FIG. 1.

As shown in FIG. 2, the flow path cassette 10 according to the present embodiment includes a soft first cassette main body 40A and a soft second cassette main body 40B to which the plurality of tubes 16 are directly connected, and a rigid frame 50 that retains the first cassette main body 40A and the second cassette main body 40B, and is fixed to the cell culturing device 14.

The first cassette main body 40A is formed as a thin rectangular sheet that possesses flexibility. The first cassette main body 40A is formed by stacking and joining (e.g., fusion bonding) together two resin sheets 42 made of a resin material in a thickness direction. In the fusion bonding of the pair of resin sheets 42, gas is supplied to and discharged from between the pair of resin sheets 42 along grooves that are formed in a fusion bonding mold, whereby flow path walls, in which the resin sheets 42 are raised and protrude with semicircular shapes in cross-section, and flow paths 44A are formed on the inner sides thereof. The material of the resin sheets 42 is not particularly limited, insofar as it possesses flexibility that is capable of being deformed by the pressure of the liquids, and for example, a vinyl chloride resin, a polyolefin resin, a polyurethane resin, or the like may be applied thereto. An embossing process may be implemented on the surface of the first cassette main body 40A, and fine convex/concave irregularities may be formed therein. A plurality of connectors 60 for connection between the plurality of tubes 16 and the flow paths 44A are provided on outer edges 41A of the first cassette main body 40A.

The second cassette main body 40B is formed as a sheet having basically the same structure as the first cassette main body 40A. The second cassette main body 40B includes a cutout part 99 which is cut out from a rectangular sheet so as to avoid holders 53 (to be described later), and is formed in a substantially L-shape. The tubes 16 which extend from the bags 18 and the bioreactor 21 are connected to the flow paths 44B of the second cassette main body 40B. The flow paths 44B of the second cassette main body 40B are connected to the flow paths 44A of the first cassette main body 40A via the interlayer connection tubes 16Q, 16R, and 16S.

Although not particularly limited to this feature, the second cassette main body 40B is one in which auxiliary flow paths 44B are aggregated in order to increase the degree of freedom in the layout of the first cassette main body 40A, and does not include sites thereon for attachment of later-described sensors and clamps and the like.

Figure 4:
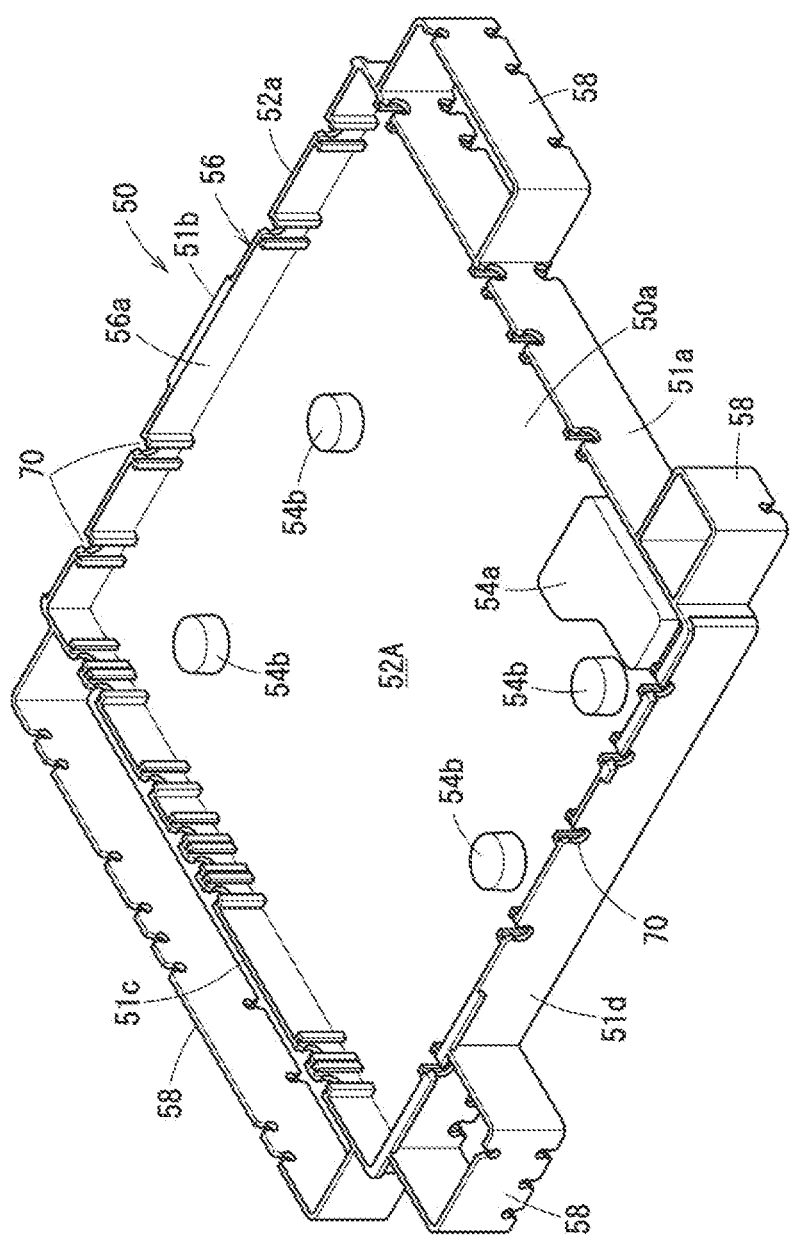
FIG. 4 is a perspective view of a bottom surface side of a frame according to at least one embodiment of the present disclosure.

On the other hand, the frame 50 is made from a resin material that is harder (e.g., having a greater modulus of elasticity) than the first cassette main body 40A and the second cassette main body 40B. The frame 50 is formed in a thin plate shape in which there are formed a first accommodation space 52A and a second accommodation space 52B in which the first cassette main body 40A and the second cassette main body 40B are accommodated. The second accommodation space 52B in which the second cassette main body 40B is accommodated is formed on the side of an upper surface 50b of the frame 50, and as shown in FIG. 4, the first accommodation space 52A in which the first cassette main body 40A is accommodated is formed on the side of a bottom surface 50a of the frame 50. The material of the frame 50 is not limited to any particular material, however, there may preferably be applied thereto a thermoplastic resin material, for example, polypropylene, polycarbonate, polyamide, polysulfone, polyarylate, methacrylate-butylene-styrene copolymer, or the like.

The frame 50 includes a rectangular flat plate-shaped cover member 54 which is slightly larger than the first cassette main body 40A, and wall-shaped side portions 56 that protrude from the outer periphery of the cover member 54 in a direction perpendicular to the cover member 54. The side portions 56 comprise first side portions 56a that project on the side of the bottom surface 50a of the frame 50, and second side portions 56b (see, e.g., FIG. 2) that project on the side of the front surface of the frame 50. The first side portions 56a and the second side portions 56b project in mutually opposite directions from the cover member 54, and encircle the outer periphery of the cover member 54 around the entire periphery thereof. The first side portions 56a and the second side portions 56b are formed integrally, and thereby form the side portions 56.

As shown in FIG. 4, in the frame 50, the first accommodation space 52A opens on the side of the bottom surface 50a of the cover member 54 through an opening 52a surrounded by the first side portions 56a. One surface of the first cassette main body 40A is exposed through the opening 52a. Engaging portions 70 in which the respective connectors 60 are arranged and retained are provided in the first side portions 56a at locations corresponding to the respective connectors 60 of the first cassette main body 40A.

Further, as shown in FIG. 2, in the frame 50, the second accommodation space 52B opens on the side of the upper surface 50b of the cover member 54 through an opening 52b surrounded by the second side portions 56b. Engaging portions 70 in which the respective connectors 60 of the second cassette main body 40B are retained are also provided in the second side portions 56b. The connectors 60 and the engaging portions 70 may form the engagement mechanisms 68 by which the first cassette main body 40A and the second cassette main body 40B are engaged with the frame 50.

Figure 3:
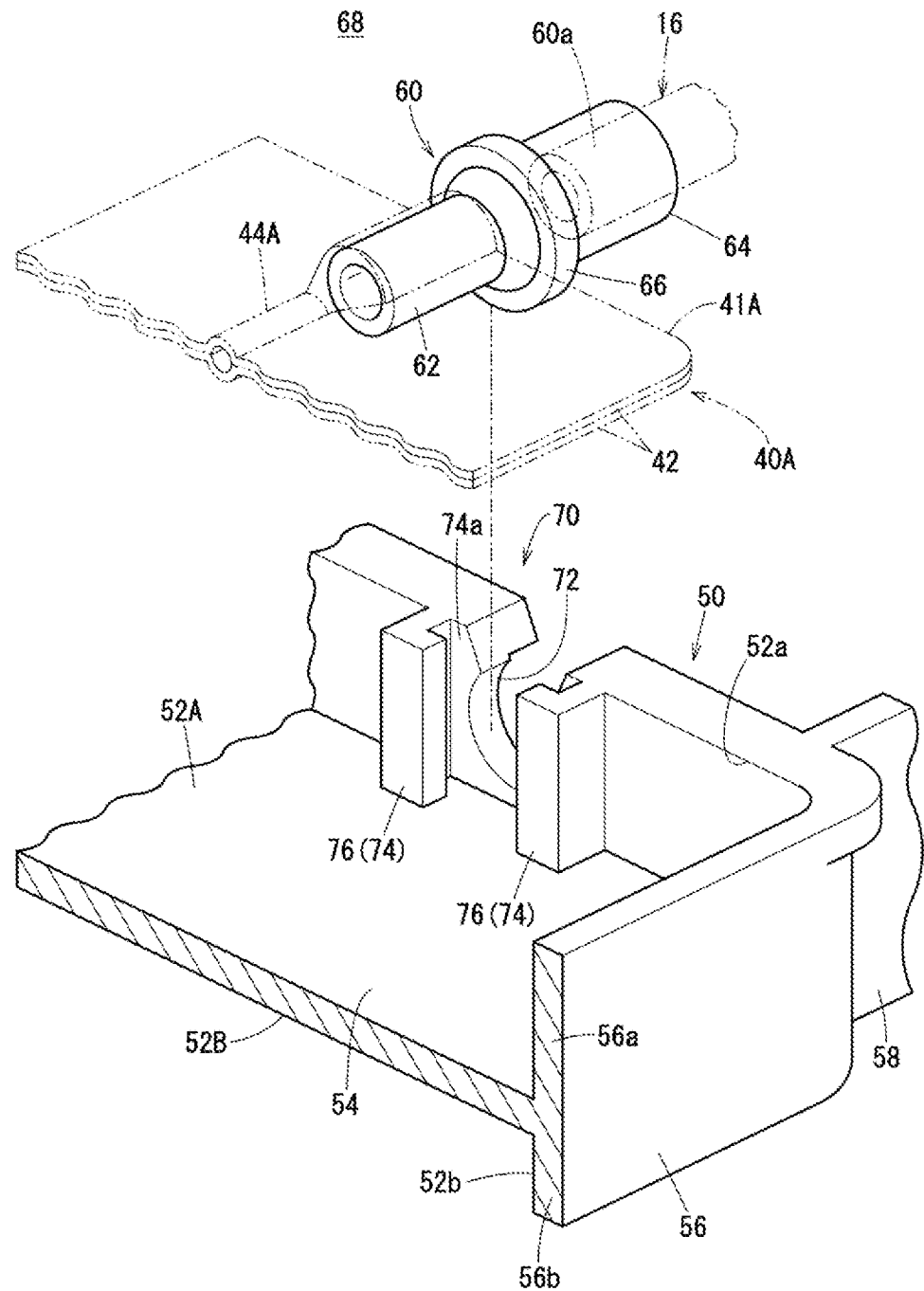
FIG. 3 is a partially enlarged perspective view of an engagement mechanism of the flow path cassette according to at least one embodiment of the present disclosure.

As shown in FIG. 3, each of the connectors 60 of the first cassette main body 40A includes a first cylindrical part 62 that is sealed by the first cassette main body 40A, a second cylindrical part 64 connected to the tube 16, and a flange 66 that protrudes radially outward between the first cylindrical part 62 and the second cylindrical part 64. Further, a communication hole 60a that penetrates through the first cylindrical part 62, the second cylindrical part 64, and the flange 66 is formed in the axial center of the connector 60.

At a time of sealing, when the two resin sheets 42 of the first cassette main body 40A are placed together and sealed, the first cylindrical parts 62 are fusion bonded to the first cassette main body 40A, in a state in which the communication holes 60a communicate with the flow paths 44 of the flow path cassette 10. Outer peripheral surfaces of the first cylindrical parts 62 are formed with a smaller diameter than the second cylindrical parts 64 in order to correspond with the flow paths 44 of the flow path cassette 10. Further, the tubes 16 are inserted inside the second cylindrical parts 64, and are firmly fixed to the second cylindrical parts 64 by an appropriate fixing means. The flanges 66 have a predetermined thickness in the axial direction of the connectors 60, and are formed in a ring shape that encircles the entire outer peripheral surface of the connectors 60.

On the other hand, the engaging portions 70 of the frame 50 include engagement recesses 72 formed by cutting out the side portions 56, and movement limiters 74 that protrude from the side portions 56 toward the inner side of the frame 50 in close proximity to the engagement recesses 72. The engagement recesses 72 are opened in the same direction as the opening 52a of the frame 50, and are formed in arcuate shapes (e.g., C-shapes) which are capable of accommodating the tubes 16 connected to the connectors 60 (e.g., second cylindrical parts 64). The engagement recesses 72 are set to a size that enables them to be firmly fitted with respect to the accommodated tubes 16 and the connectors 60. The depth of the engagement recesses 72 is such that the engagement recesses 72 that fix the connectors 60 of the first cassette main body 40A is deeper than the engagement recesses 72 that fix the connectors 60 of the second cassette main body 40B. Consequently, the first cassette main body 40A and the second cassette main body 40B can be fixed to the frame 50 in a state of being superimposed in the thickness direction.

Each of the movement limiters 74 may include a pair of hook portions 76 which project, by a short length, inwardly from the inner surface of the side portions 56, and are bent in perpendicular directions and in directions to approach mutually toward each other. In addition, the movement limiters 74 allow the flanges 66 of the connectors 60 to be accommodated in fixed spaces 74a formed between the movement limiters 74 and the side portions 56.

Movement of the connectors 60 in the axial direction is restricted by disposing the flanges 66 in the fixed spaces 74a. Further, the connectors 60 are accommodated in the engagement recesses 72 together with the tubes 16, whereby the connectors 60 become engaged with the engaging portions 70 (e.g., in the side portions 56) at an appropriate engagement force, and the connectors 60 are prevented from slipping out from the frame 50.

The structure of each of the connectors 60 of the second cassette main body 40B is the same as the structure of each of the connectors 60 of the above-described first cassette main body 40A. Further, the structure of the engaging portions 70 that are formed on the second side portions 56b is the same as the structure of the engaging portions 70 that are formed on the first side portions 56a.

As described above, the engagement mechanisms 68 retain the connectors 60 of the first cassette main body 40A and the second cassette main body 40B by the respective engaging portions 70 of the frame 50. Consequently, the flow path cassette 10 becomes placed in a state in which the first cassette main body 40A, the second cassette main body 40B, and the frame 50 are integrated (placed in a state in which they can be handled together collectively).

Figure 6:
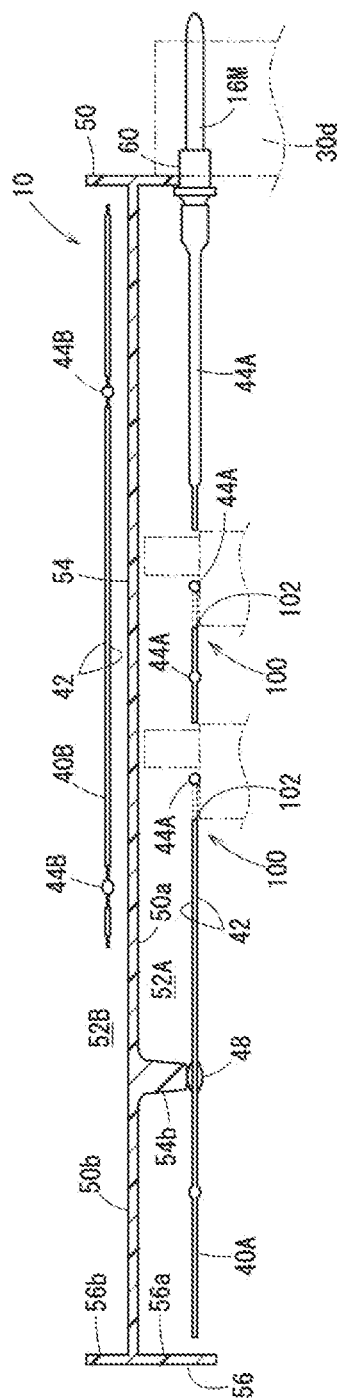
FIG. 6 is a cross-sectional view taken along line VI-VI of FIG. 5.

As shown in FIG. 2, the aforementioned engagement mechanisms 68 are disposed respectively on four sides of the rectangular shaped flow path cassette 10. More specifically, the first cassette main body 40A (see FIG. 2) is equipped with the connectors 60 on each of the outer edges 41A on four sides, and the frame 50 is equipped with the engaging portions 70 on each of the first side portions 56a on four sides. Further, as shown in FIG. 2, the second cassette main body 40B is equipped with the connector 60 on the outer edges 41B on three sides, and the frame 50 is equipped with the engaging portions 70 on each of the second side portions 56b on three sides. Consequently, as shown in FIG. 6, the frame 50 retains the sheet-shaped first cassette main body 40A and the sheet-shaped second cassette main body 40B in a stretched state, and is capable of suitably causing the respective flow paths 44A and 44B to be extended along a planar direction.

As shown in FIG. 2, holders 53 for retaining the gas exchanger 29 are provided on the upper surface 50b of the frame 50. The holders 53 are disposed in the vicinity of a second side 51b to which the first EC tube 16H and the second EC tube 16I are connected. The holders 53 fix the gas exchanger 29 to the upper surface 50b of the frame 50, in a state in which the longitudinal direction of the gas exchanger 29 is aligned with the second side 51b. Because the gas exchanger 29 is arranged in close proximity to the connectors 60 of the first EC tube 16H and the second EC tube 16I, the ports 29c and 29d of the gas exchanger 29 and the first cassette main body 40A can be connected by the relatively short gas exchange tubes 16V and 16W.

As shown in FIG. 4, a first convex portion 54a and second convex portions 54b are formed on the bottom surface 50a of the frame 50. The first convex portion 54a is formed in the same shape as the planar shape of a later-described liquid level target detection unit 80 of the first cassette main body 40A, and is disposed at a position facing toward the liquid level target detection unit 80. A plurality of second convex portions 54b are provided, and are arranged at positions facing toward later-described pressure target detection units 48.

By the second convex portions 54b of the frame 50, it is possible to ensure that the first cassette main body 40A and the second cassette main body 40B are placed in contact with the frame 50. Further, in a case that it is made easy for the first cassette main body 40A and the second cassette main body 40B to be placed in contact with the frame 50 due to the thickness of the cover member 54 of the frame 50, or due to the frame shape of the frame 50, the second convex portions 54b need not necessarily be provided on the frame 50.

As shown in FIG. 6, when the first cassette main body 40A, the second cassette main body 40B, and the frame 50 are integrated in the flow path cassette 10, the first cassette main body 40A and the second cassette main body 40B are arranged in an overlapping manner in the thickness direction with the cover member 54 being sandwiched therebetween. The first cassette main body 40A is arranged on the side of the bottom surface 50a of the cover member 54, and the second cassette main body 40B is arranged on the side of the upper surface 50b of the cover member 54 of the frame 50. Since the second cassette main body 40B is separated from the first cassette main body 40A by the cover member 54, the second cassette main body 40B does not interfere with the pressure target detection units 48, or the flow path opening and closing units 100 that are attached to the first cassette main body 40A. Therefore, the flow paths 44 can be arranged in the second cassette main body 40B, even at positions facing toward the pressure target detection units 48 and the flow path opening and closing units 100.

Figure 5:
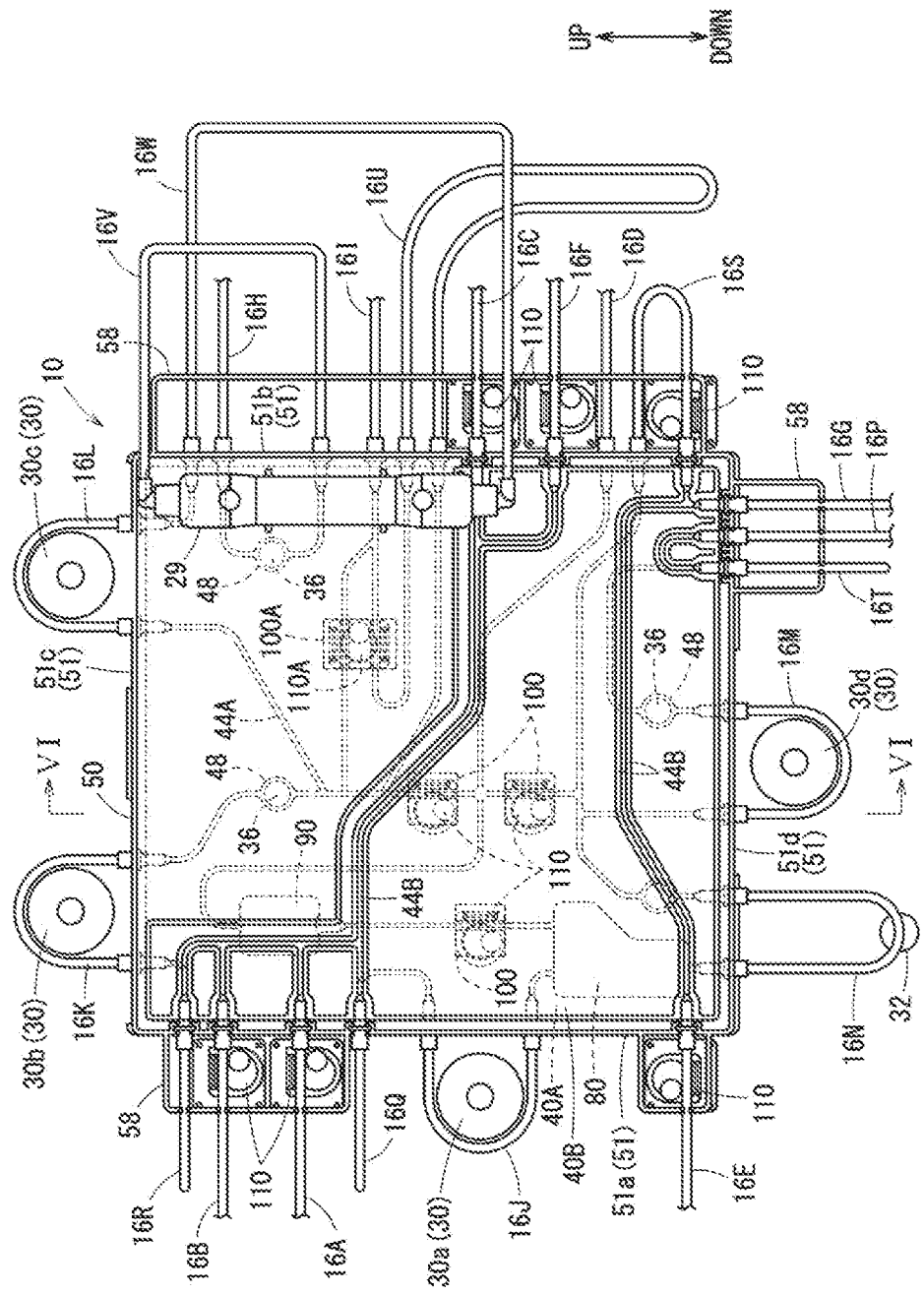
FIG. 5 is a plan view showing a layout of the flow path cassette of FIG. 1 in a state of being attached to a cell culturing device.

As shown in FIG. 5, the flow path cassette 10 is set inside the cell culturing device 14 with the planar direction of the first cassette main body 40A and the second cassette main body 40B being in an upright posture along the direction of gravity (e.g., in the vertical direction). More specifically, in the interior of the cell culturing device 14, the flow path cassette 10 is fixed to the cassette placement location of the cell culturing device 14 while being oriented in the vertical direction shown in FIG. 5. Moreover, FIG. 5 shows, in a state of being mounted in the cell culturing device 14, the flow path cassette 10 which is in a posture as viewed from the side of the upper surface 50b of the frame 50, and for convenience of explanation, the flow paths 44A of the first cassette main body 40A are shown by dashed lines. In the case that a plurality of the cell culturing kits 12 are installed in the cell culturing device 14, a plurality of flow path cassettes 10 are arranged in an overlapping manner in the thickness direction of the frame 50.

Outer edges 51 of the frame 50 may include a first side 51a (e.g., as shown in the left-hand side of FIG. 5), a second side 51b (e.g., as shown in the right-hand side of FIG. 5), a third side 51c (e.g., as shown in the upper side of FIG. 5), and a fourth side 51d (e.g., as shown in the lower side of FIG. 5). The cell solution tube 16A, the cleaning solution tube 16B, and the collection tube 16E are connected to the first side 51a. More specifically, the tubes 16 from the cell solution bag 18A, the cleaning solution bag 18B, and the collection bag 18E, which are individually disposed in each cell culturing kit 12, are collectively connected to the first side 51a. The cell solution tube 16A, the cleaning solution tube 16B, and the collection tube 16E are connected to the second cassette main body 40B. Further, the interlayer connection tubes 16R and 16Q are connected to the first side 51a.

The culture medium tube 16C, the waste liquid tube 16D, and the release solution tube 16F are connected to the second side 51b. In this manner, the connected positions of the tubes 16 of the culture medium bag 18C, the waste liquid bag 18D, and the release solution bag 18F, which can be commonly used in (e.g., shared by) the plurality of cell culturing kits 12, are collectively arranged on the second side 51b. Further, the tubes 16 that make up the EC loop, namely, the first EC tube 16H, the second EC tube 16I, and the gas exchange tubes 16V and 16W, as well as the sensor tube 16U and the interlayer connection tube 16S are connected to the second side 51b. One side of each of the culture medium tube 16C, the release solution tube 16F, and the interlayer connection tube 16S is connected to the second cassette main body 40B.

Further, in the flow path cassette 10, four pumps 30 are arranged at positions in close proximity to the sides in a state of being set in the cell culturing device 14. The pumps 30 include a first pump 30a disposed in close proximity to the first side 51a, a second pump 30b and a third pump 30c disposed in close proximity to the third side 51c, and a fourth pump 30d disposed in close proximity to the fourth side 51d. The first pump 30a delivers the liquid into the IC loop, and the second pump 30b delivers the liquid into the EC loop. Further, the third pump 30c circulates the liquid of the EC loop, and the fourth pump 30d circulates the liquid of the IC loop.

Therefore, in the cell culturing kit 12 (e.g., in the flow path cassette 10, etc.), the first pump tube 16J is connected to the first side 51a, a second pump tube 16K and a third pump tube 16L are connected to the third side 51c, and the fourth pump tube 16M is connected to the fourth side 51d. The first to fourth pump tubes 16J to 16M are arranged in a manner so that the portions thereof that are folded back in an arcuate shape are wrapped around circular shaped wound portions of the first to fourth pumps 30a to 30d. By being rotated in a squeezing manner around the respective wrapped around first to fourth pump tubes 16J to 16M, the first to fourth pumps 30a to 30d apply a fluid force to the liquids inside the first to fourth pump tubes 16J to 16M.

Further, the first IC tube 16P and the second IC tube 16G that form the IC loop of the bioreactor 21, and the sampling tube 16T are connected to the fourth side 51d of the frame 50. By providing the first IC tube 16P and the second IC tube 16G forming the IC loop on a different side than a side where the first EC tube 16H and the second EC tube 16I forming the EC loop are provided, it is possible to prevent connection mistakes.

Furthermore, in the cell culturing system 22, in the set state, the air bubble sensor 32 is arranged at a position in the vicinity of the fourth side 51d of the frame 50. Therefore, in the cell culturing kit 12, the air bubble sensor tube 16N is connected to the fourth side 51d, and the air bubble sensor tube 16N is arranged so as to face toward the air bubble sensor 32. The air bubble sensor 32 is not particularly limited, but for example, there may be applied thereto an ultrasonic sensor or the like that sandwiches the air bubble sensor tube 16N between a pair of non-illustrated inspection walls, and which transmits ultrasonic waves between the inspection walls.

In addition, in the set state, in the cell culturing system 22, a plurality of clamps 110 are arranged at positions in close proximity to the outer side of the flow path cassette 10 and at position on the inner side of the flow path cassette 10. More specifically, on the outer side of the flow path cassette 10, in the set state, the clamps 110 are arranged in the vicinity of the cell solution tube 16A, the cleaning solution tube 16B, the culture medium tube 16C, the collection tube 16E, and the release solution tube 16F, respectively. Under the control of the cell culturing device 14, by the respective tubes 16 being sandwiched therein, the clamps 110 act to close the respective tubes 16. Further, the plurality of clamps 110 are also disposed on the inner side of the flow path cassette 10, and serve to open and close the flow paths 44A of the first cassette main body 40A. The configuration of the clamps 110 will be described later.

The frame 50 of the flow path cassette 10 includes retaining frames 58 on three sides, namely, the first side 51a, the second side 51b, and the fourth side 51d of the side portions 56. The retaining frames 58 retain the tubes 16 at positions separated a predetermined distance from the side portions 56. The retaining frames 58 hold the tubes 16 in an extended state in the vicinity of the side portions 56 to thereby prevent the tubes 16 from becoming blocked. Further, the retaining frames 58 make it possible to suitably execute opening and closing of the tubes 16 by the clamps 110 which are disposed inside the retaining frames 58.

The first cassette main body 40A, as shown in FIG. 2, in addition to being equipped with the above-described flow paths 44A, comprises the plurality of pressure target detection units 48 in communication with the flow paths 44A, the liquid level target detection unit 80, a check valve unit 90, and a plurality of flow path opening and closing units 100 configured together with the flow paths 44A.

As shown in FIG. 2, the liquid level target detection unit 80 is disposed at one location inside the first cassette main body 40A, and is capable of detecting a liquid level of the liquid that flows through the liquid level target detection unit 80. The liquid level target detection unit 80 includes a storage space 80a (see FIG. 8A) in which the liquid is temporarily stored, in the interior (e.g., between the pair of resin sheets 42) thereof. When the first cassette main body 40A is viewed from the front, the liquid level target detection unit 80 is formed in a rectangular shape with four rounded corners. The longitudinal direction of the liquid level target detection unit 80 lies along the direction of gravity in the set state of the first cassette main body 40A. The length of the liquid level target detection unit 80 in the longitudinal direction is preferably formed to be greater than or equal to two times the length of the liquid level target detection unit 80 in the lateral direction.

Figure 8A:
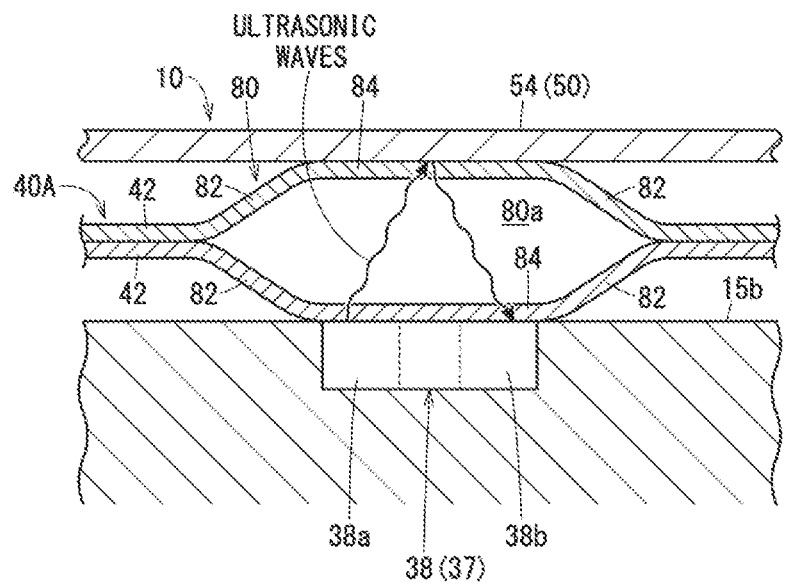
FIG. 8A is a cross-sectional view in the vicinity of an ultrasonic sensor of the cell culturing system according to at least one embodiment of the present disclosure.

In the cross-sectional view shown in FIG. 8A, the liquid level target detection unit 80 includes outer peripheral portions 82 that smoothly rise from a fusion bonded portion of the pair of resin sheets 42, and flat portions 84 that are formed in flat shapes on the inner side of the outer peripheral portions 82. The flat portions 84 are configured in a manner so as to maintain parallelism between the pair of resin sheets 42, and the flat portions 84 are arranged so as to face toward the liquid level sensor 37 in the set state. A cross-sectional area of a location in the storage space 80a in which the liquid is stored is sufficiently greater than (e.g., greater than or equal to two times) the cross-sectional area of the flow paths 44A. In the liquid level target detection unit 80 which is configured in the foregoing manner, the liquid level rises when the inflowing amount of the liquid flowing into the storage space 80a exceeds the outflowing amount, whereas the liquid level decreases when the inflowing amount falls below the outflowing amount of the liquid from the storage space 80a.

The liquid level sensor 37 provided in the cell culturing device 14 includes an upper sensor that detects an upper limit position of the liquid level in the storage space 80a, and a lower sensor that detects a lower limit position thereof. More specifically, the cell culturing system 22 is configured in a manner so that, by detecting the upper limit position and the lower limit position at the time that the liquid is stored, air is removed from the liquid while the amount of liquid stored in the liquid level target detection unit 80 is adjusted. Further, the upper sensor and the lower sensor face toward the flat portions 84 in the set state, and are capable of stably detecting the liquid level. Although the type of the liquid level sensor 37 is not particularly limited, an ultrasonic sensor 38 (see, e.g., FIG. 8A) or a capacitance sensor 39 (see, e.g., FIG. 8B) may be applied thereto.

For example, as shown in FIG. 8A, the ultrasonic sensor 38 includes an oscillating unit 38a that outputs ultrasonic waves, and a receiving unit 38b that detects the ultrasonic waves. The oscillating unit 38a and the receiving unit 38b are disposed on an arrangement surface 15b on which the liquid level target detection unit 80 is arranged. More specifically, for the ultrasonic sensor 38, there is applied a reflection type that utilizes the frame 50 of the flow path cassette 10. In this case, the ultrasonic sensor 38 causes the ultrasonic waves that are emitted from the oscillating unit 38a to be reflected at the cover member 54 (e.g., wall portion), and detects the reflected waves at the receiving unit 38b. Moreover, the arrangement surface 15b and the cover member 54 are configured in a manner so as to form a state in which the first cassette main body 40A (e.g., each of the pair of resin sheets 42) is placed in contact therewith accompanying setting of the flow path cassette 10.

In addition, it is preferable for the flow path cassette 10 to be in a state in which the liquid level target detection unit 80 is placed in contact with the cover member 54 (e.g., the first convex portion 54a) in advance. Further, for example, the resin sheets 42 that are associated with the liquid level target detection unit 80 may be fixed to the cover member 54. Further, the ultrasonic sensor 38 may be configured so as to project from the arrangement surface 15b in order to be placed in contact with the liquid level target detection unit 80. Further, as shown in FIG. 4, the cover member 54 may project out toward the ultrasonic sensor 38 in order to be placed in contact with the liquid level target detection unit 80.

Figure 8B:
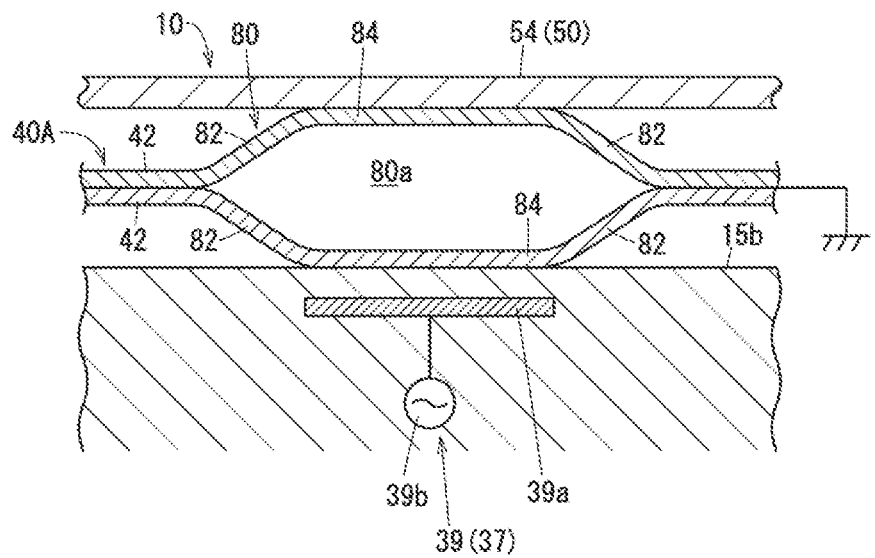
FIG. 8B is a cross-sectional view a capacitance sensor of the cell culturing system according to at least one embodiment of the present disclosure.

Alternatively, as shown in FIG. 8B, the capacitance sensor 39 includes a flat plate 39a in the arrangement surface 15a on which the liquid level target detection unit 80 is arranged, and further includes an alternating current (AC) power source 39b that is electrically connected to the flat plate 39a. More specifically, since it can be said that the liquid level target detection unit 80 of the cassette main body 40 is grounded via the frame 50 and the cell culturing device 14, a capacitance is generated between the liquid level target detection unit 80 and the flat plate 39a to which AC power is supplied from the AC power source 39b. The capacitance changes depending on whether a gas or a liquid exists within the storage space 80a that faces toward the flat plate 39a, and therefore, by the capacitance sensor 39 detecting such a change in capacitance, it is possible to detect the level of the liquid that is stored in the storage space 80a.

Moreover, in the case that the capacitance sensor 39 is used as the liquid level sensor 37, the liquid level target detection unit 80 may be disposed in a slightly spaced apart manner without being placed in contact with the arrangement surface 15a. This is because, even if separated in this manner, the capacitance sensor 39 is still capable of detecting the change in capacitance due to a difference between the liquid and the gas. Further, a surface (e.g., one surface or the other surface) of the liquid level target detection unit 80 may be subjected to embossing or the like to form fine concave/convex irregularities thereon.

The check valve unit 90 of the first cassette main body 40A shown in FIG. 2 has a function of allowing a fluid (e.g., a liquid and/or a gas) to flow in a first direction (the rightward direction in FIG. 5), while blocking flow of the fluid in a second direction (the leftward direction in FIG. 5) opposite to the first direction. Although the configuration of the check valve unit 90 is not particularly limited, it can be constructed by overlaying a valve structure (e.g., a structure in which two sheets for the valve that become narrower toward the first direction are joined, and form connecting portions at both ends in the first and second directions) between the pair of resin sheets 42.

On the other hand, the plurality of flow path opening and closing units 100 are configured by forming cutout windows 102 at adjacent positions on both sides in the lateral direction (in the widthwise direction) perpendicular to the direction in which the flow paths 44A extend. Specifically, both sides of each of the flow paths 44A are cut out in rectangular shapes. More specifically, in the flow path opening and closing units 100, due to the cutout windows 102, each of the flow paths 44A becomes placed in a state of being separated from the resin sheets 42.

Figure 9A:
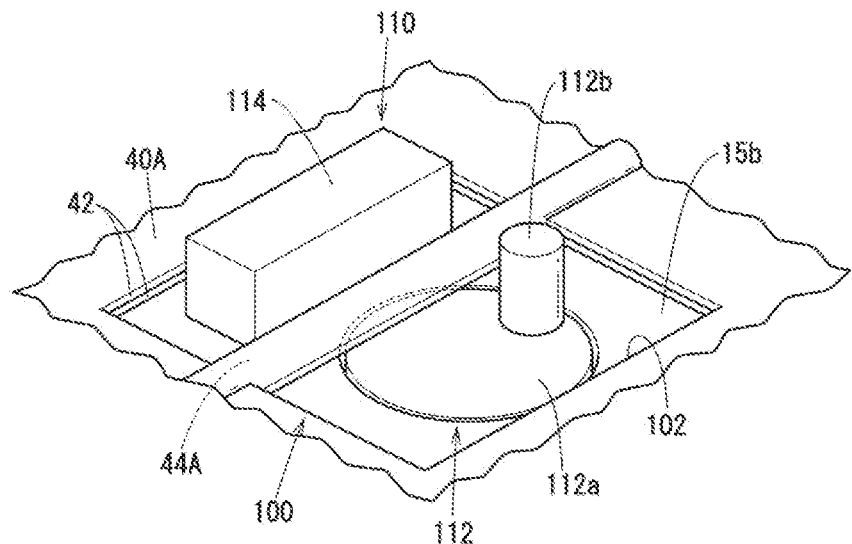
FIG. 9A is an enlarged perspective view showing an open state of a flow path opening and closing unit and a clamp according to at least one embodiment of the present disclosure.
Figure 9B:
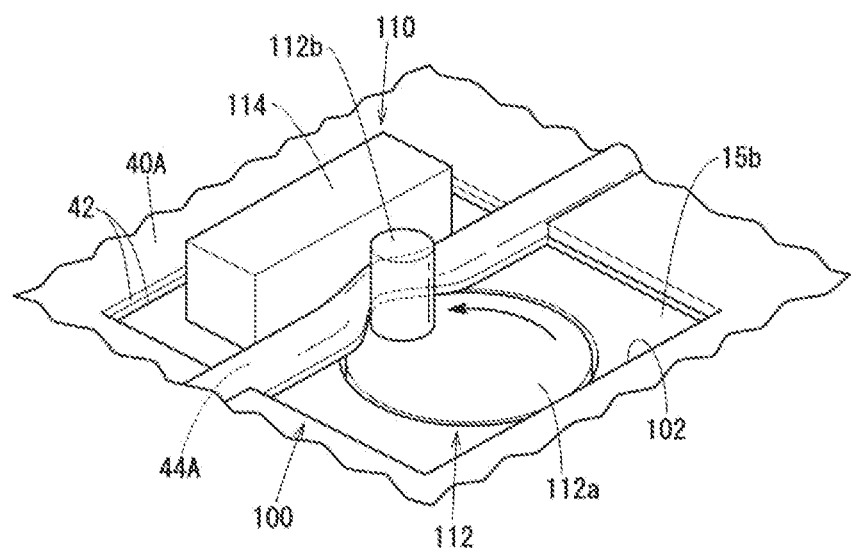
FIG. 9B is an enlarged perspective view showing a closed state of the flow path opening and closing unit and the clamp according to at least one embodiment of the present disclosure.

As shown in FIG. 5, when the flow path cassette 10 is set in the cell culturing device 14, the clamps 110 are arranged in each of the plurality of flow path opening and closing units 100. As shown in FIG. 9A, each of the clamps 110 is equipped with a rotating body 112 (rotating member) disposed on an arrangement surface 15b, and a fixed body 114 that projects a short length from the arrangement surface 15b.

The rotating body 112 includes a disk portion 112a that faces toward both the flow path 44A and the cutout window 102, and one pin 112b (e.g., a displacement body) disposed in close proximity to an outer circumferential edge of the disk portion 112a. The disk portion 112a rotates about a center point under the control of the cell culturing device 14, and causes the pin 112b to be brought into close proximity to and separated away from the fixed body 114. When set, the pin 112b is inserted into the cutout window 102 at a position separated from the fixed body 114 to a certain extent.

The fixed body 114 is formed in a rectangular block shape that can be inserted into the cutout window 102, and projects at a height that is shorter than the side portions 56 of the frame 50. The fixed body 114, by cooperating with the rotating body 112, realizes opening and closing of each of the flow paths 44A. More specifically, accompanying rotation of the rotating body 112, when the pin 112b is closest in proximity to the fixed body 114, the clamp 110 crushes the flow path 44A between the pin 112b and the fixed body 114 and thereby closes the flow path 44A. Moreover, the clamps 110 which are attached to the tubes 16 also have the same structure as described above.

Figure 10A:
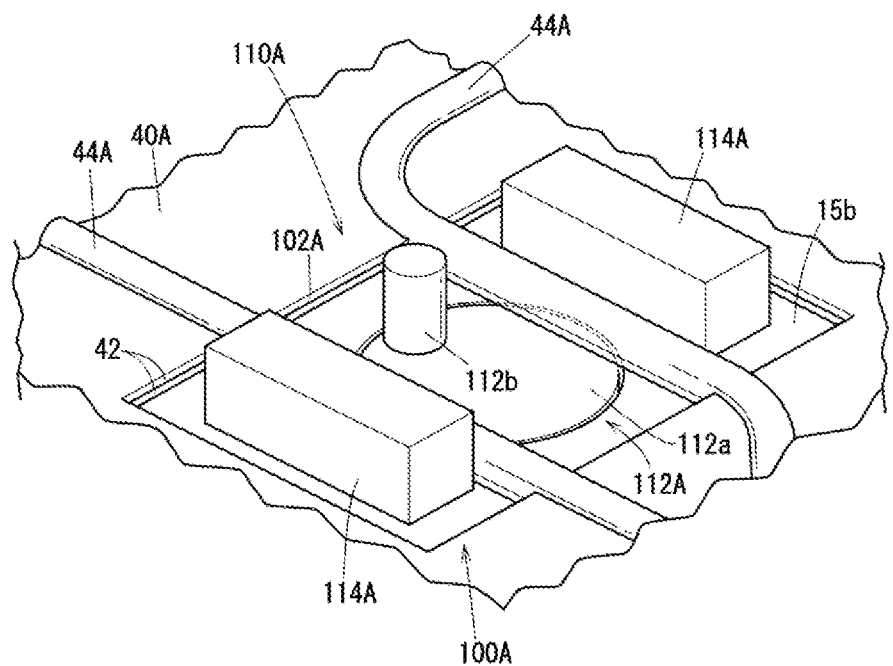
FIG. 10A is an enlarged perspective view showing an open state of a multiple flow path opening and closing unit and a switchable clamp according to at least one embodiment of the present disclosure.

As shown in FIG. 10A, a multiple flow path opening and closing unit 100A comprises a cutout window 102A in order to selectively open and close two flow paths 44A that are arranged side by side in parallel. In the cutout window 102A, the two flow paths 44A are arranged in parallel, and the outer circumferential surfaces (e.g., cylindrical flow path walls) of the flow paths 44A are separated with respect to the resin sheet 42 over the entire circumference thereof. The cutout window 102A is formed in a rectangular shape, and is provided so as to include the flow paths 44A.

On the other hand, in the cell culturing device 14, in the set state of the flow path cassette 10, a switchable clamp 110A is arranged with respect to the multiple flow path opening and closing unit 100A. The switchable clamp 110A is equipped with a rotating body 112A provided on the arrangement surface 15b, and a plurality of (two) fixed bodies 114A that project from the arrangement surface 15b.

The rotating body 112A, similar to the above-described rotating body 112, includes a disk portion 112a, and one pin 112b (e.g., displacement body) disposed in close proximity to an outer circumferential edge of the disk portion 112a. The disk portion 112a is arranged so as to face toward two of the flow paths 44A. The disk portion 112a rotates about a center point under the control of the cell culturing device 14, and causes the pin 112b to be brought into close proximity to and separated away from the two fixed bodies 114A. When set, the pin 112b is arranged in a space between the two flow paths 44A. One of the two fixed bodies 114A is arranged on an outer side of one of the flow paths 44A, and the other is arranged on an outer side of the other flow path 44A.

Figure 10B:
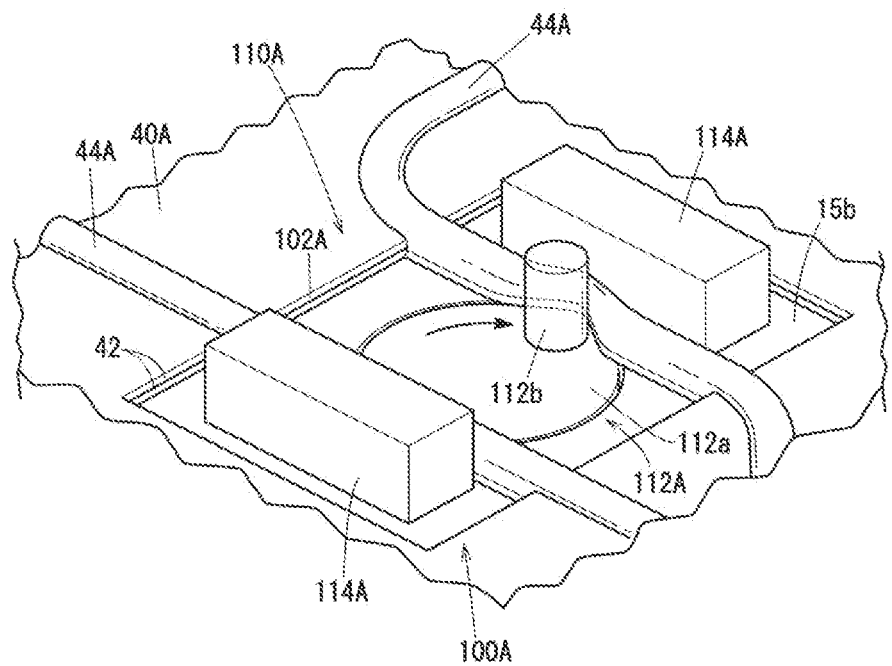
FIG. 10B is an enlarged perspective view showing a state in which one of the flow paths is closed by the switchable clamp of FIG. 10A.

As shown in FIG. 10B, when the pin 112b is closest in proximity to the one fixed body 114A, the switchable clamp 110A closes the flow path 44A by crushing the flow path 44A between the pin 112b and the fixed body 114A. At this time, the opposite flow path 44A is opened. Further, when the pin 112b is closest in proximity to the other fixed body 114A, the switchable clamp 110A closes the other flow path 44A, while on the other hand, opens the one flow path 44A.

As shown in FIG. 2, the plurality of pressure target detection units 48 are provided on the first cassette main body 40A. In a plan view of the first cassette main body 40A, the pressure target detection units 48 are formed by being spread out in a planar direction and in substantially perfect circular shapes with respect to the connected flow paths 44A.

Figure 11:
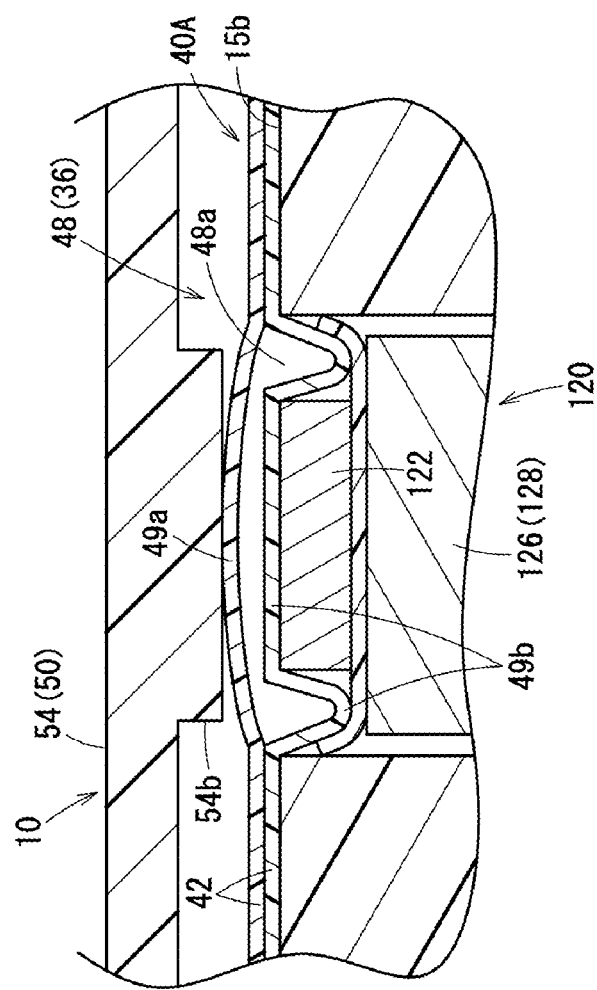
FIG. 11 is a cross-sectional view of a pressure target detection unit.

As shown in FIG. 11, the pressure target detection unit 48 includes first and second bulging portions 49a and 49b where the pair of resin sheets 42 bulge outward in the thickness direction. In addition, a flow-through chamber 48a is formed between the first and second bulging portions 49a and 49b. The first bulging portion 49a is in close contact with and is supported on the second convex portion 54b of the frame 50. On the other hand, the second bulging portion 49b bulges out and is restored in the thickness direction of the resin sheet 42, based on the pressure of the liquid that flows into the flow-through chamber 48a.

A plate member 122 made of a magnetic material is joined to each of the second bulging portions 49b. The plate member 122 is arranged at a position facing toward a load cell 120 of the pressure sensor 36 that is provided in the cell culturing device 14. The load cell 120 includes a magnet 126 at a distal end of a pressure detecting unit 128, and the pressure detecting unit 128 and the pressure target detection unit 48 are connected by the plate member 122 being attracted to the magnet 126. When a positive pressure acts on the flow-through chamber 48a, a corresponding load acts on the pressure detecting unit 128, and the load cell 120 detects the load. Consequently, the internal pressure of the flow path 44A can be detected.

Returning to FIG. 1, the cell culturing device 14 in which the cell culturing kit 12 is mounted is equipped with a box-shaped device main body 130, and a stand 132 on which the bags 18 of the cell culturing kit 12 are retained. Further, a touch panel 134 (e.g., a display operation unit) for carrying out operations and displays when the culturing process is performed is provided on an outer surface of the device main body 130. Furthermore, in the interior of the device main body 130, there are provided a cassette placement location (not shown) in which the flow path cassette 10 is fixed in an upright posture and the bioreactor 21 is retained at an appropriate height, and a control unit 136 that controls operation of the cell culturing system 22. Moreover, although illustration thereof is omitted, it goes without saying that the cell culturing device 14 may include a functional unit for realizing various conditions that are required for culturing of cells. For example, the cell culturing device 14 may be equipped with a temperature adjustment unit that executes a temperature control to maintain the culturing environment at 37° C.

Figure 7:
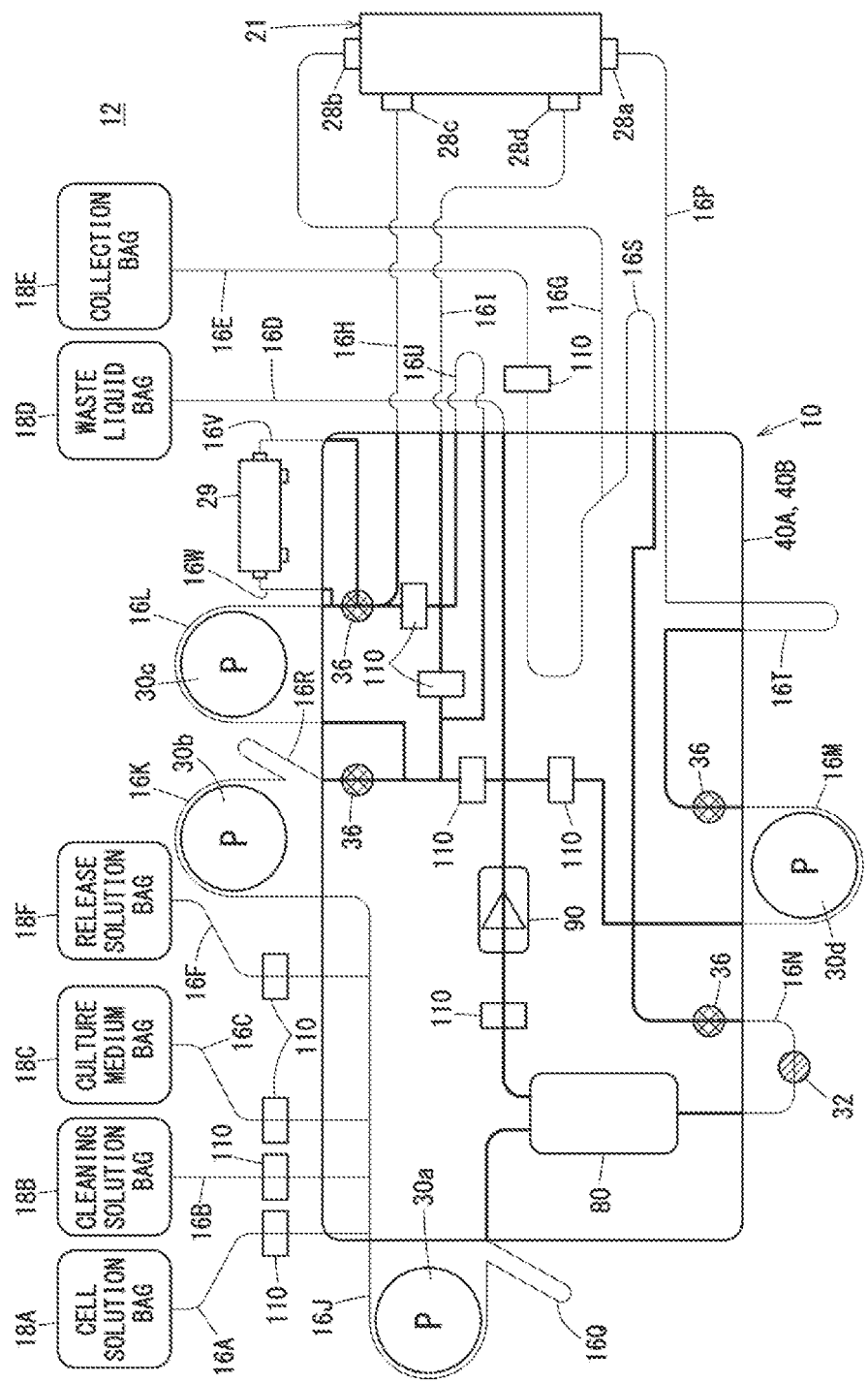
FIG. 7 is a block diagram showing a circuit configuration of the cell culturing kit of FIG. 1.

The cell culturing kit 12 described above is set in the cell culturing device 14, and thereby forms a flow path circuit as shown in FIG. 7. In the figure, the portion surrounded by the rectangular frame is a configuration of the flow paths 44 formed in the first cassette main body 40A and the second cassette main body 40B. Among the flow paths, the flow paths 44 formed in the first cassette main body 40A are shown by thick lines. It should be noted that the sides of the rectangle in the figure do not correspond to the first to fourth sides 51a to 51d of the frame 50 shown in FIG. 5.

The flow path cassette 10 having the flow paths 44B includes the IC loop for supplying liquid to the internal cavities of the hollow fibers 24 during the culturing process, and the EC loop for supplying liquid to the outer sides (e.g., the main space 26a) of the hollow fibers 24. The IC loop is a circulation circuit through which liquid circulates between the cassette main bodies 40 and the internal cavities of the hollow fibers 24 of the bioreactor 21. On the other hand, the EC loop is a circulation circuit through which liquid circulates between the cassette main bodies 40 and the outer side of the bioreactor 21.

According to at least one embodiment of the present disclosure, a configuration is provided in which the cell solution bag 18A, the cleaning solution bag 18B, the culture medium bag 18C, and the release solution bag 18F are connected to the flow paths 44B of the second cassette main body 40B, and therefore, the degree of freedom in the arrangement of the positions where the tubes 16 connected thereto are connected to the flow path cassette 10 is increased. Owing to this feature, the tubes 16 of the bags 18 that are common to the plurality of cell culturing kits 12, and the tubes 16 of the bags 18 that are unique to each of the cell culturing kits 12 can be connected separately to different sides. Consequently, routing of the tubes 16 can be facilitated, and mistakes in the operation of connecting the tubes can be prevented.

Further, the first IC tube 16P and the second IC tube 16G are connected to the flow paths 44B of the second cassette main body 40B. Owing to this feature, a side of the frame 50 to which the tubes 16 connected to the IC loop of the bioreactor 21 are connected, and a side of the frame 50 to which the tubes 16 connected to the EC loop are connected can be configured differently. Consequently, it is possible to prevent connection mistakes of the tubes 16 from occurring.

The flow path cassette 10, the cell culturing kit 12, and the cell culturing system 22 according to the present embodiment exhibit the following advantageous effects.

A first aspect of the embodiments described herein is characterized by the flow path cassette 10 in which there are aggregated the flow paths 44A and 44B through which the culture medium (e.g., cell-containing liquid) used for culturing of cells flows. The flow path cassette 10 comprises the first cassette main body 40A in which the flow paths 44A are formed between the pair of superimposed resin sheets 42, the second cassette main body 40B in which the flow paths 44B are formed between the pair of superimposed resin sheets 42, and the frame 50 which is formed to be harder than the first cassette main body 40A and the second cassette main body 40B, and which supports the first cassette main body 40A and the second cassette main body 40B. The frame 50 includes the flat plate-shaped cover member 54 disposed between the first cassette main body 40A and the second cassette main body 40B, the first side portions 56a that project from the outer edges 51 of the cover member 54 in a first direction perpendicular to the cover member 54, and the second side portions 56b that project from the outer edges 51 of the cover member 54 in a second direction opposite to the first direction. In addition, the first cassette main body 40A is accommodated in the first accommodation space 52A defined in a recessed shape formed by the first side portions 56a and the cover member 54, and the second cassette main body 40B is accommodated in the second accommodation space 52B defined in a recessed shape formed by the second side portions 56b and the cover member 54.

In accordance with the above-described configuration, by providing the second cassette main body 40B, the flow paths 44B that straddle over the flow paths 44A of the first cassette main body 40A can be arranged, and therefore, the degree of freedom in the layout of the flow paths 44A and 44B in the flow path cassette 10 is enhanced. Further, since the first cassette main body 40A and the second cassette main body 40B are separated by the cover member 54, the clamps 110 and the sensors installed on the side of the first cassette main body 40A do not interfere with the second cassette main body 40B. Consequently, the degree of freedom in the layout of the flow paths 44B of the second cassette main body 40B is enhanced. Further, the clamps 110 and the sensors can be also disposed on the flow paths 44B of the second cassette main body 40B.

In the above-described flow path cassette 10, the interlayer connection tubes 16Q, 16R, and 16S that connect the flow paths 44A of the first cassette main body 40A and the flow paths 44B of the second cassette main body 40B are connected to the outer sides of the first side portions 56a and the second side portions 56b. In accordance with this feature, the flow paths 44A and 44B of the different layers can be connected to each other simply by connecting the interlayer connection tubes 16R, 16S, and 16Q from the outer sides of the flow path cassette 10.

In the above-described flow path cassette 10, the connectors 60 in communication with the flow paths 44A and 44B may be provided on the outer edges 41A and 41B of the first cassette main body 40A and the second cassette main body 40B, and the engaging portions 70 that engage with the connectors 60 may be provided on the first side portions 56a and the second side portions 56b. In accordance with such a configuration, the first cassette main body 40A and the second cassette main body 40B can be retained respectively in the first accommodation space 52A and the second accommodation space 52B in a stretched state, and the flow paths 44A and 44B can be made to extend along a planar direction.

In the above-described flow path cassette 10, the frame 50 may be formed in a rectangular shape as viewed in plan, and among the plurality of connectors 60, the connectors 60 to which the bags 18 are connected may be arranged collectively on a same side of the first side portions 56a and the second side portions 56b. In accordance with such a configuration, it is possible to simplify routing of the tubes 16, together with preventing the user from making connection mistakes.

In the flow path cassette 10 having the above-described aspect, a group of the connectors 60 connected to the IC (intra capillary) loop of the bioreactor 21 in which the hollow fibers 24 are used, and a group of the connectors 60 connected to the EC (extra capillary) loop of the bioreactor 21 may be provided on different sides of the first and second side portions 56a and 56b. In accordance with this feature, it is possible to simplify routing of the tubes 16, together with preventing the user from making connection mistakes.

A second aspect of the present disclosure is characterized by the cell culturing kit 12 equipped with the flow path cassette 10 of the first aspect, the plurality of bags 18 connected to such a flow path cassette 10, the bioreactor 21 in which the hollow fibers 24 connected to the flow path cassette 10 are used, and the gas exchanger 29 connected to the flow path cassette 10. In accordance with the cell culturing kit 12, since the flow path cassette 10 according to the first aspect is provided therein, the degree of freedom in the layout of the flow paths 44A and 44B is increased, and routing of the tubes 16 can be simplified, together with preventing the user from connecting the tubes 16 in a mistaken manner.

A third aspect of the present disclosure is characterized by the cell culturing system 22 that includes the cell culturing kit 12 according to the second aspect, and the cell culturing device 14 in which the cell culturing kit 12 is set. In accordance with the cell culturing system 22, since the flow path cassette 10 according to the first aspect is provided therein, the degree of freedom in the layout of the flow paths 44A and 44B is increased, and routing of the tubes 16 can be simplified, together with preventing the user from connecting the tubes 16 in a mistaken manner. In particular, in the case that a plurality of cell culturing kits 12 are set in the cell culturing device 14 in order to culture cells, it may be considered to provide and use certain ones of the bags 18 (or tanks) in common with the plurality of cell culturing kits 12. Even in such a case, since routing of the tubes 16 can be simplified, the ability to expand the system is superior.

What is claimed is:

1. A flow path cassette in which flow paths are aggregated, the flow path cassette comprising:
   a first cassette main body in which a first group of flow paths is formed between a first pair of superimposed resin sheets;
   a second cassette main body in which a second group of flow paths is formed between a second pair of superimposed resin sheets;
   a plurality of connectors that communicate with the first group of flow paths and the second group of flow paths at outer edges of the first cassette main body and the second cassette main body; and
   a frame formed to be harder than the first cassette main body and the second cassette main body and configured to support the first cassette main body and the second cassette main body, the frame comprising:

a flat plate-shaped cover member disposed between the first cassette main body and the second cassette main body;
first side portions that project from outer edges of the cover member in a first direction perpendicular to the cover member;
second side portions that project from the outer edges of the cover member in a second direction opposite to the first direction; and
engaging portions disposed on the first side portions and the second side portions and configured to engage with the plurality of connectors,
wherein the first cassette main body is accommodated in a first accommodation space defined in a first recessed shape formed by the first side portions and the cover member, and wherein the second cassette main body is accommodated in a second accommodation space defined in a second recessed shape formed by the second side portions and the cover member.

2. The flow path cassette of claim 1, further comprising:
an interlayer connection tube configured to connect at least one flow path of the first group of flow paths of the first cassette main body and of the second group of flow paths of the second cassette main body, the interlayer connection tube being connected to an exterior surface of one of the first side portions and an exterior surface of one of the second side portions.

3. The flow path cassette of claim 1, wherein the frame further comprises:
a plurality of retaining frames to support a plurality of tubes.

4. The flow path cassette of claim 1, wherein the frame is formed in a rectangular shape in a plan view, wherein the plurality of connectors includes a first group of connectors to which bags are connected, and wherein the first group of connectors is arranged at a first side of the frame.

5. The flow path cassette of claim 4, wherein a second group of connectors of the plurality of connectors is connected to an intracapillary loop of a bioreactor that includes hollow fibers, and wherein a third group of connectors of the plurality of connectors is connected to an extracapillary loop of the bioreactor and are arranged at a second side of the frame.

6. The flow path cassette of claim 1, wherein the second cassette main body includes a cutout.

7. The flow path cassette of claim 6, wherein the cutout includes a flow path open/close unit configured to open and close at least one flow path of the second group of flow paths.

8. A flow path cassette in which flow paths are aggregated, the flow path cassette comprising:
a first cassette main body that includes a first set of flow paths, the first set of flow paths formed between a first set of superimposed resin sheets;
a second cassette main body that includes a second set of flow paths, the second set of flow paths formed between a second set of superimposed resin sheets;
a plurality of connectors in communication with the first set of flow paths and the second set of flow paths, the plurality of connectors being disposed on outer edges of the first cassette main body and the second cassette main body;
a frame comprising:
a first accommodation space formed in a first bottomed shape exposed by a first opening, the first accommodation space being configured to accommodate therein the first cassette main body; and
a second accommodation space formed in a second bottomed shape exposed by a second opening, the second accommodation space being configured to accommodate therein the second cassette main body,
wherein the first accommodation space and the second accommodation space are formed integrally so as to face toward each other with respective bottomed portions thereof in contact with each other; and
an interlayer connection tube configured to connect a first flow path of the first cassette main body and a second flow path of the second cassette main body, wherein the interlayer connection tube is connected to an outer side of a first side portion of the frame and an outer side of a second side portion of the frame.

9. The flow path cassette of claim 8, wherein the first opening and the second opening provided in the first accommodation space and the second accommodation space are of a same size.

10. The flow path cassette of claim 9, wherein the frame further comprises:
a plurality of retaining frames to support a plurality of tubes.

11. The flow path cassette of claim 10, wherein the plurality of retaining frames hold the plurality of tubes in an extended state.

12. The flow path cassette of claim 8, wherein the frame is rectangularly shaped when viewed in a plan view, wherein the plurality of connectors has a first set of connectors configured to connect to a set of bags, and wherein the first set of connectors are arranged at a first side of the frame.

13. The flow path cassette of claim 8, wherein the second cassette main body includes a cutout.

14. The flow path cassette of claim 13, wherein the cutout includes a flow path open/close unit configured to open and close at least one flow path of the second set of flow paths.

15. A cell culturing kit, comprising:
a flow path cassette in which flow paths are aggregated;
a plurality of bags connected to the flow path cassette;
a bioreactor that includes hollow fibers connected to the flow path cassette; and
a gas exchanger connected to the flow path cassette,
wherein the flow path cassette comprises:
a first cassette main body in which a first group of flow paths is formed between a first pair of superimposed resin sheets;
a second cassette main body in which a second group of flow paths is formed between a second pair of superimposed resin sheets;
a plurality of connectors in communication with the first group of flow paths and the second group of flow paths, the plurality of connectors being disposed on outer edges of the first cassette main body and the second cassette main body; and
a frame formed to be harder than the first cassette main body and the second cassette main body and configured to support the first cassette main body and the second cassette main body, wherein the frame comprises:
a flat plate-shaped cover member disposed between the first cassette main body and the second cassette main body;
first side portions that project from outer edges of the cover member in a first direction perpendicular to the cover member;
second side portions that project from the outer edges of the cover member in a second direction opposite to the first direction; and engaging portions disposed on the first side portions and the second side portions and configured to engage with the plurality of connectors, wherein the first cassette main body is accommodated in a first accommodation space defined in a first recessed shape formed by the first side portions and the cover member, and wherein the second cassette main body is accommodated in a second accommodation space defined in a second recessed shape formed by the second side portions and the cover member.

16. The cell culturing kit of claim 15, further comprising: an interlayer connection tube at an exterior surface of the frame to connect a first flow path of the first cassette main body to a second flow path of the second cassette main body.

17. The cell culturing kit of claim 16, wherein the interlayer connection tube is connected to the frame at one of the first side portions and one of the second side portions.

18. The cell culturing kit of claim 17, wherein the frame is formed in a rectangular shape in a plan view, wherein the plurality of connectors includes a first set of connectors to which bags are connected, and wherein the first set of connectors are arranged at a first side of the frame.

19. The cell culturing kit of claim 18, wherein a second group of connectors of the plurality of connectors are connected to an intracapillary loop of the bioreactor, and wherein a third group of the plurality of connectors are connected to an extracapillary loop of the bioreactor are provided on a second side of the frame.

20. The cell culturing kit of claim 15, wherein the second cassette main body includes a cutout, and wherein the cutout includes a flow path open/close unit configured to open and close at least one flow path of the second group of flow paths.

* * * * *